United States Patent Office 3,647,734
Patented Mar. 7, 1972

3,647,734
PREPARATION OF FLAME RETARDANT COMPOSITION FOR CELLULOSIC MATERIAL
James E. Hardwicke, Columbia, and Bernard Scheffler and Herman S. Weisz, Rock Hill, S.C., assignors to M. Lowenstein & Sons, Inc., New York, N.Y.
No Drawing. Filed Mar. 26, 1970, Ser. No. 23,079
Int. Cl. C08g 51/24, 37/32
U.S. Cl. 260—29.4 R
5 Claims

ABSTRACT OF THE DISCLOSURE

A composition for rendering cellulosic material flame retardant is prepared by maintaining the intermediate reaction product 3-(di-isopropylphosphono) proprionamide in aqueous solution below its melting point for methylolation with formaldehyde to form the N-hydroxymethyl derivative, and then formulating this derivative with an aqueous methylolmelamine resin solution and an acid catalyst for pad-dry-cure application to the cellulosic material. Cellulosic material treated with the resulting composition is rendered self-extinguishing and retains this characteristic after fifty washings.

BACKGROUND OF THE INVENTION

It is known from U.S. Pat. No. 3,374,292 that substituted phosphono-amides can be formulated with aminoplasts for flame retardant application to cellulosic materials. Of this class of amides, principal interest has centered on N-hydroxymethyl-3-(dimethylphosphono) proprionamide, and use of this material has been found to yield effective flame retardant properties, although practical experience has shown it to be difficult to handle both by reason of odor problems and because formulations containing it tend to gum processing equipment badly. Such difficulties can be dealt with by expedients generally available to the art that have developed from the solution of similar problems in other types of processing, but a further peculiar problem has remained in maintaining the material dependably repetitive in effect from batch to batch, and the present invention is directed toward solution of this latter problem.

SUMMARY OF THE INVENTION

This invention employs the di-isopropyl analogue and provides dependably repetitive results by attention to its preparation for formulation with the aminoplast and other materials with which it is to be applied. Preparation of the analogue involves obtaining the corresponding phosphono-proprionamide as an intermediate reaction product and then methylolating with formaldehyde to form the N-hydroxymethyl derivative.

If the intermediate is isolated after completion of the initial reaction, a crystalline product of relatively high melting point (93–95° C.) results that is subject to side reactions upon subsequent methylolation, which may account for the inconsistencies in flame retardant performance that have been observed in practice. In any event, this possible source of practical difficulty is eliminated according to the present invention by inhibiting crystallization through addition of sufficient water to the reaction batch to maintain the intermediate in solution at a temperature below its melting point.

Orderly methylolation then follows by simply adding formaldehyde (e.g., 37% Formalin) while maintaining the batch alkaline until digestion is completed. Then, for the purposes of the present invention, the batch is buffered to an acid pH and filtered to yield a clear aqueous solution containing at least 70% N-hydroxymethyl-3-(di-isopropylphosphono) proprionamide, which is formulated with an aqueous methylolmelamine resin solution and an acid catalyst for application to produce an exceptionally regular and persistent flame retardant effect on cellulosic substrate.

DETAILED DESCRIPTION OF THE INVENTION

More specifically, preparation and formulation of a flame retardant composition in the foregoing manner proceeds representatively as follows.

A suitable glass reactor, fitted with a stirring assembly and surrounded by a tub of tap water, is charged with acrylamide (8.946 kg.; 126 moles) and freshly distilled di-isopropyl hydrogen phosphite (20.916 kg.; 126 moles). While stirring this charge, a 20% solution of sodium methylate in methanol is added in a slow stream to catalyze reaction. The resulting reaction becomes highly exothermic immediately, reaching 100° C. upon addition of about 200 g. of the sodium methylate solution. When the temperature of the reaction mixture reaches 115° C., catalyst addition is discontinued until it falls to 105° C., and then additional shots of catalyst are employed to raise the reaction temperature again to 115° C. After about an hour, and a total catalyst consumption of 900 g., further shots of catalyst produce no temperature rise. The reaction batch is then allowed to digest for 30 to 60 minutes as the temperature falls to 95–98° C., whereupon slight crystallization of 3-(di-isopropylphosphono) proprionamide begins to occur and the heat of crystallization raises the batch temperature again to 100–103° C. At this point sufficient water (2.97 kg.) is added to keep the reaction product in solution with a resulting drop in batch temperature to about 84° C. Formalin (37%) is then added for methylolation, while maintaining the batch alkaline with 50% sodium hydroxide; e.g., 50 g. of caustic is added after an initial 2 kg. addition of Formalin, and then the Formalin addition is completed to a total of 13.275 kg. (163.5 moles), as additional caustic is employed to maintain a pH of 8–9.5, and as the batch temperature falls further to about 75° C. After three hours digestion about 2.5% free formaldehyde is present. The resulting solution is then cooled to room temperature, buffered with phosphoric acid to a pH in the order of 5, and then filtered to obtain the previously mentioned N-hydroxymethyl derivative in aqueous solution at a concentration of 73.8%.

Formulation of the derivative thus obtained for flame retardant application is exemplified by the following composition employed for treating 52″ napped and printed cotton fabric having a 40 x 44 construction and a weight in the grey of 2.75 running yards per pound. The proportions given are for a batch that is bulked with water to 50 gallons:

| Constituent: | Pounds |
|---|---|
| Foregoing derivative in aqueous solution | 195 |
| Aerotex Resin 23 Special | 26 |
| Aerotex Resin P–225 | 30 |
| Igepal CO–630 | 1.5 |
| Polyethylene softener | 9 |
| Amine hydrochloride catalyst | 20 |

Aerotex Resin 23 Special, which is available from American Cyanamid Co., is a 50% aqueous solution of highly methylated, substantially completely methylolated melamine containing a small amount of a blend of uron and urea-formaldehyde resins, and is used in the composition to fix the phosphonoamide derivative on the substrate effectively and durably.

Aerotex Resin P–225, which is also available from American Cyanamid Co., is hexamethoxymethylmelamine supplied in viscous liquid form, and is employed to balance a stiffening effect of the 23 Special resin so that the treated substrate retains a satisfactory hand.

Igepal CO–630, which is available from General Aniline & Film Corp., is a nonionic surfactant formed by the combination of an alkylphenol with ethylene oxide and is employed as a wetting agent.

The polyethylene softener, such as Pelusoft NV available from Tanotex Chemical Corp., is employed primarily as a lubricant for rendering the treated substrate readily subject to needle penetration for subsequent sewing, although it also enhances hand to some extent as well.

The amine hydrochloride catalyst, which is available from Monsanto Co., among others, is the reaction product of hydrochloric acid with 2-methyl-2-aminopropanol-1, and is employed to catalyze curing of the composition.

A composition of the foregoing form has a pH of about 5.9 and is applied to the substrate by padding at an 80 to 90% pick-up so that a solids add-on of about 25 to 30% is obtained. The padding is done after framing of the previously napped and printed goods which should come to the pad with an acid pH, preferably under 6. The framing is carried out at 260 to 270° F., and the substrate is dried following padding at about the same temperature before curing at 320° F. for 5 to 6 minutes, after which thorough soaping with a perborate and soda ash mix, hot and cold rinsing, and re-framing, followed by Sanforizing if desired, are employed to complete production of the fabric substrate in the piece.

The result is a treated cotton fabric that has been rendered durably flame retardant without disturbing the natural hand of the goods. The flame retardant effect is obtained consistently and persists through more than 50 home launderings with char lengths of less than 5" and no afterglow (AATCC 34–1966). Moreover, shrinkage is readily controlled within 2 to 3% and a durable press rating of at least 3.5 is regularly attained. Similar results are possible with any cellulosic substrate.

The present invention has been described in detail above for purposes of illustration only and is not intended to be limited by this description or otherwise to exclude any variation or equivalent form or procedure that would be apparent from, or reasonably suggested by, the foregoing disclosure to the skill of the art.

We claim:
1. The method of preparing a composition for rendering cellulosic material flame retardant which comprises, obtaining 3-(di-isopropylphosphono) proprionamide as an intermediate reaction product of acrylamide and di-isopropyl hydrogen phosphite in the presence solely of 20% sodium methylate in methanol as catalyst, while modulating addition of the catalyst to maintain a substantially steady exotherm during the reaction, and while inhibiting crystallization of the reaction product upon completion of the reaction by addition of sufficient water to maintain it in solution at a temperature below its melting point, methylolating said reaction product in said solution with formaldehyde to form its N-hydroxymethyl derivative while maintaining the solution alkaline, then buffering to an acid pH and filtering to recover a clear aqueous solution of at least 70% N-hydroxymethyl-3-(di-isopropylphosphono) proprionamide, and formulating the solution thus obtained with an aqueous methylolmelamine resin solution and an acid catalyst for application to the cellulosic material.

2. The method defined in claim 1 and further characterized in that the agent used for said buffering is phosphoric acid and the acid pH attained is in the order of 5.

3. The method defined in claim 1 and further characterized in that said methylolmelamine resin solution contains 50% of a highly methylated, substantially completely methylolated melamine together with small amounts of blended uron and urea-formaldehyde resins.

4. The method defined in claim 1 and further characterized in that the acid catalyst employed in formulating the composition for application is an amine hydrochloride obtained as the reaction product of 2-methyl-2-aminopropanol-1 with hydrochloric acid.

5. The method defined in claim 1 and further characterized in that hexamethoxymethylmelamine is also added in formulating the composition for application.

References Cited
UNITED STATES PATENTS

| 3,556,840 | 1/1971 | Tesoro | 117—136 |
|---|---|---|---|
| 2,754,319 | 7/1956 | Johnston | 260—942 |
| 3,374,292 | 3/1968 | Zahir | 260—943 |
| 3,381,062 | 4/1968 | Zahir | 260—943 |

JOHN C. BLEUTGE, Primary Examiner

U.S. Cl. X.R.

117—136; 260—849, 942, 943